Reissued Apr. 7, 1925. Re. 16,039

UNITED STATES PATENT OFFICE.

GOTTFRIED MEYER, OF ST. PAUL, MINNESOTA.

PROCESS OF PREPARING CHEESE.

No Drawing. Original No. 1,462,375, dated July 17, 1923, Serial No. 575,764, filed July 18, 1922. Application for reissue filed January 8, 1925. Serial No. 1,325.

*To all whom it may concern:*

Be it known that I, GOTTFRIED MEYER, a citizen of the United States, residing at St. Paul, in the county of Ramsey and State of Minnesota, have invented certain new and useful Improvements in a Process of Preparing Cheese; and I do hereby declare the following to be a full, clear, and exact description of the invention, such as will enable others skilled in the art to which it appertains to make and use the same.

In accordance with the present invention cheese that has already been prepared is utilized as the base and is selected according to the flavor and nature of the cheese to be prepared. This already prepared cheese or base is comminuted and mixed with natural milk, cream or butter, which for convenience I denominate a milk fat containing product and which may previously have been pasteurized or sterilized, and heated and constantly stirred until a certain result is obtained, when the excess of milk (if there is an excess after the mixing process) is drawn off and the resultant mass worked in a manner similar to the pulling of candy and when the proper consistency has been attained, the product is packed in cans, or other suitable commercial packages for future use. This process results in the production of a cheese having a special and refined texture and which will not change no matter how long it is kept at a suitable temperature.

In accordance with the present invention, the already prepared cheese or base is comminuted, being preferably ground by machinery and to each two pounds of grated cheese is added the necessary amount of natural milk, cream or butter, or a suitable mixture of any two or all of these. This milk product and the cheese are thoroughly mixed and are gradually heated to a temperature of approximately 125° Fahrenheit. The mixture is maintained at this temperature for a period of ten to fifteen minutes, depending on the condition or texture of the cheese, and is constantly stirred. After the mixture has been thus treated, a change commences to take place and the product assumes a stringy, doughlike or elastic appearance and when this stage is reached, the excess of milk, if any, is drawn off and the cheese is worked by being pulled in a manner similar to taffy candy until it reaches the desired consistency. The prepared cheese is now placed in cans and sealed airtight, or in other suitable receptacles, and, if placed in cans is sterilized at a temperature of approximately 190° Fahrenheit. If placed in other packages, it will not be necessary to sterilize the product.

Cheese prepared according to this process does not change in texture or flavor and will not spoil or grow strong. It is to be understood that any flavor, such as pimento, may be added according to the nature of the cheese to be prepared.

It should be stated that cream or butter may be substituted for, or added to, the milk, so that under certain conditions milk, cream or butter, or a mixture of any two, or all of them, may be used according to the nature of the product to be produced, and to the condition and constituents of the cheese that is being worked.

I vary the product employed so as to bring the finished cheese up to the desired amount of butter-fat.

What is claimed is:

1. The process of preparing cheese which consists in adding a milk fat containing product to already prepared cheese as a base, then mixing and heating the cheese and the product added thereto until the same assumes a stringy, doughlike or elastic appearance and subsequently working the mixture until the same assumes the required consistency.

2. The process of preparing cheese which consists in adding natural milk to already prepared cheese as a base, then mixing and heating the cheese and milk until the same assumes a stringy, dough-like or elastic appearance, then drawing off the excess of milk, if any, and subsequently working the product until the same assumes the required consistency.

3. The process herein described of preparing cheese which consists in comminuting already prepared cheese as a base, then adding thereto a milk fat containing product and gradually heating the mixture and constantly stirring the same until the mixture assumes a stringy condition, after which it is worked until it acquires the proper consistency.

4. The process herein described of preparing cheese which consists in comminuting already prepared cheese as a base, then adding natural milk thereto and gradually heating the mixture and constantly stirring the same until the product assumes a stringy condition, after which the excess of milk is drawn off and the product worked by being pulled until it acquires the proper consistency.

5. The herein described process of preparing cheese which consists of comminuting already prepared cheese as a base, then adding natural milk thereto, then gradually heating the mass and constantly stirring the same until the product assumes a stringy, dough-like or elastic condition, and working the product by pulling until it assumes the proper consistency, then placing the product in cans which are sealed airtight and sterilized.

6. The herein described process of preparing cheese which consists in comminuting already prepared cheese as a base, then adding thereto a milk fat containing product to increase the butter-fat content and gradually heating and stirring the mixture until it assumes a stringy condition, after which the mixture is worked until it acquires the proper consistency.

In witness whereof, I have hereunto set my hand at Minneapolis, Hennepin County, Minnesota, this 3rd day of January, 1925.

GOTTFRIED MEYER.